United States Patent Office 3,521,534
Patented July 21, 1970

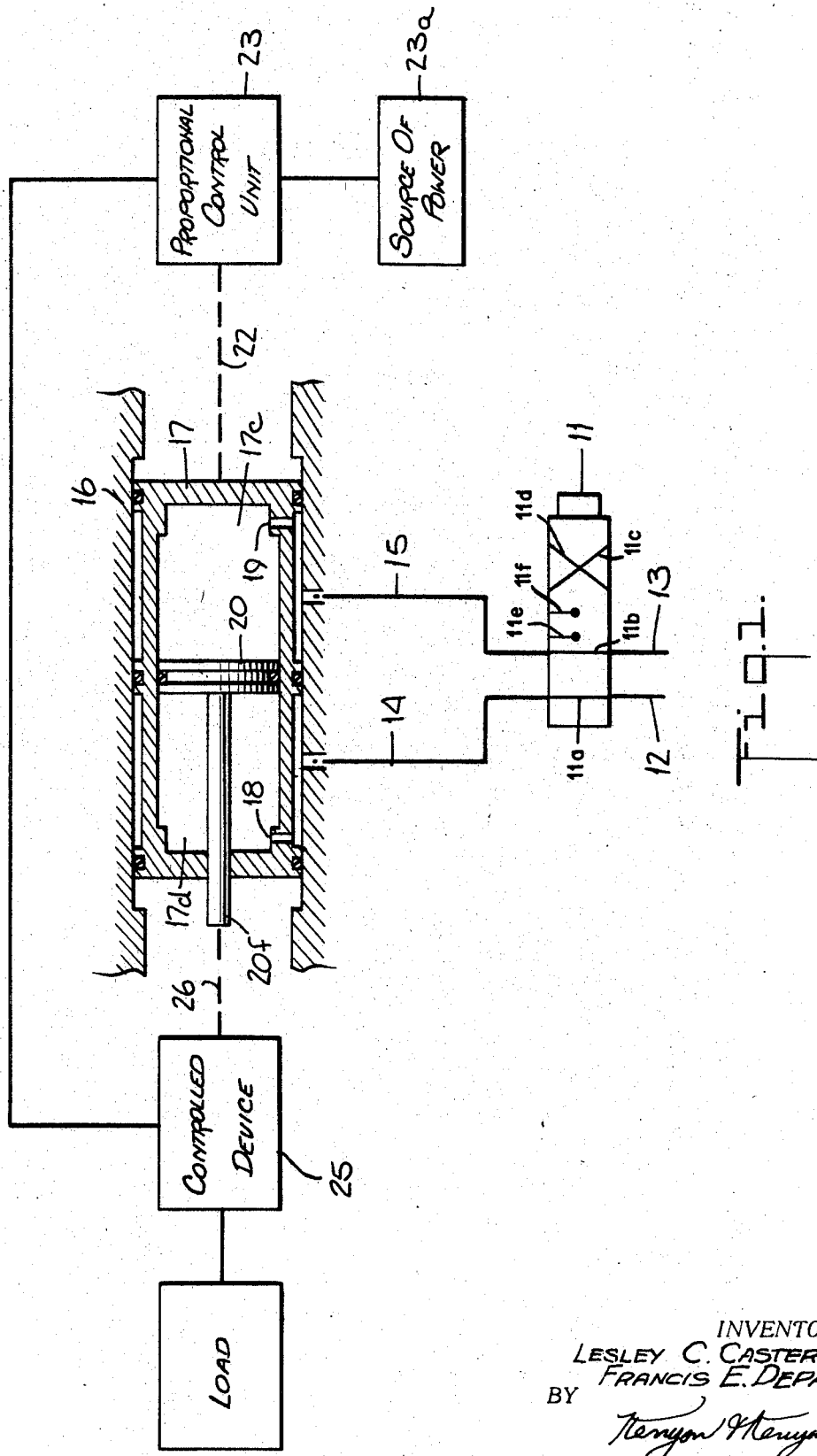

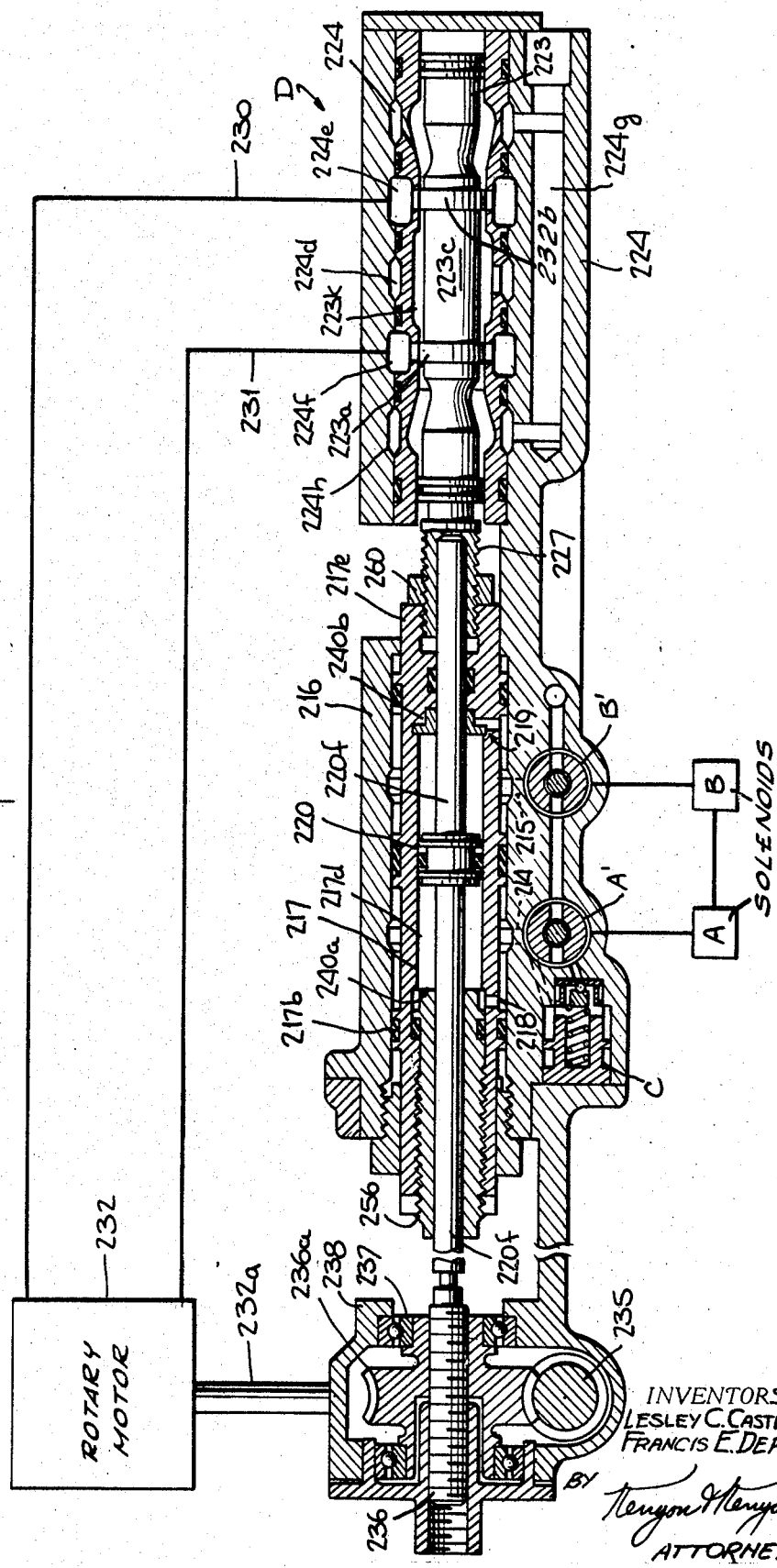

3,521,534
HYDRAULIC LINK IN A CONTROL SYSTEM
Lesley C. Casterline, Hurst, and Francis E. De Pauw, Fort Worth, Tex., assignors to Bell Aerospace Corporation, Wheatfield, N.Y., a corporation of Delaware
Filed July 18, 1968, Ser. No. 745,755
Int. Cl. F15b 13/16; F01b 15/02
U.S. Cl. 91—385                                               9 Claims

ABSTRACT OF THE DISCLOSURE

A control system is disclosed in which a proportional control device controls power to and the movement of a controlled device, the latter being coupled to a load. A pair of hydraulic power elements, such as a piston and cylinder, hydraulically link the controlled device and the proportional control unit to insure that the controlled device will not be subjected to sudden changes in power applied to it by the proportional control device. This provides gradual acceleration and deceleration of the controlled device and the load it moves thereby minimizing chances of shock and/or jolt occurring in the system from sudden changes in motion of the load. The system also provides for the gradual stopping of the controlled device after it has undergone a predetermined amount of travel. This system is of particular use in hydraulic systems and especially those that are used in aircraft.

---

This invention relates to a control system and in particular to a control system that can gradually accelerate and decelerate a load.

BACKGROUND OF THE INVENTION

In a typical control system a control unit controls a source of power to and therefore the movement of a controlled device, the latter moving a load which may in certain situations be massive. When the control unit stops power from moving the controlled device and hence from moving the load, the load may come to an abrupt stop that can, because of inertia effects, create undesirable and dangerous shocks in the system. This problem is general to all control systems and particularly troublesome in hydraulic systems where the shocks created in the system by the sudden stop of a massive load result in pressure surges in the hydraulic fluid which may cause leakage and/or a rupture in the conduits and valves in the system. Specifically, this problem arises as a severe matter in one helicopter design where a massive pod is mounted on a stubby wing. The pod is hydraulically rotated relative to the wing. If the pod is brought to a sudden stop from its rotational movement by stopping rotation of its hydraulic motor, a severe jolt will be transmitted to the air frame. Similarly, the pod has a maximum amount of rotation in each direction of its travel determined by certain stops. If the pod were to hit these stops without some provision being made for dissipating the kinetic energy of the moving pod, an undesirable shock would be applied to the hydraulic system and to the helicopter air frame.

A similar problem, which arises in control systems and hydraulic systems and helicopter hydraulic systems in particular, is that of providing a gradual acceleration to a fairly massive load. If the power is not gradually applied to move the massive load there will be a sudden and undesirable shock in the system that moves the load when power is applied due to the inertia of the load. Thus it is desirable to gradually accelerate and decelerate a massive load in any control system and in particular in an aircraft hydraulic system where stability is important and hydraulic failures can be fatal.

The prior art recognized the need to isolate shock in a hydraulic control system and in one way attempted to solve the problem by securing the hydraulic control system to a rigid support. The support had appropriate damping means and the shock was transferred to the support. This was satisfactory where a massive support could be used and where space and weight considerations were not important. Obviously this prior art technique would not be suitable in an aircraft where it is very important to minimize the weight and size of any of the control systems and where there is no rigid support to which the shock can be transferred.

Heretofore in helicopters the position of the pod was controlled by the pilot pushing a button which actuated a solenoid valve which directed fluid to a hydraulic motor which rotated the pod. When the fluid was directed to the hydraulic motor there was a shock and/or jolt to the helicopter from the pressure surge resulting from the resistance of the motor to move due to the inertia of the pod. When the pilot desired to stop the movement of the pod he de-energized the solenoid valve which stopped power fluid from being directed to the hydraulic motor that moved the pod. This would isolate the hydraulic fluid between the hydraulic motor and the solenoid valve stopping movement of the hydraulic motor and pod. As there would be no way to dissipate the energy associated with stopping movement of the pod there would be a severe shock to the hydraulic system and/or the helicopter.

It is therefore an object of the present invention to provide improved means which can be used to gradually decelerate and accelerate loads.

A further object of the present invention is to provide means in a control system that will hydraulically link a controlled device which moves a load and the control unit so there will be a gradual deceleration and acceleration of the controlled device.

Yet another object of the present invention is to provide means that will prevent the shock and/or jolt that will result from a load abutting a stop after reaching the end of its travel in a hydraulic system by slowly bringing the load to a gradual halt just before it abuts the stop.

More particularly, it is an object of the present invention to provide a control system that can be used in a helicopter to gradually accelerate and decelerate a helicopter pod and gradually halt the movement of the helicopter pod before its rotation is impeded by one of its stops, thus eliminating shocks and/or jolts to the helicopter.

SUMMARY OF THE INVENTION

Briefly, in accordance with the present invention, the foregoing and other objects are accomplished by utilizing a hydraulic link in a control system between the controlled device which moves the load and a proportional control unit which controls the movement of the controlled device. The hydraulic link is a cylinder and piston which cylinder and piston are able to move relative to each other. The cylinder is mechanically coupled to the control unit while the piston is mechanically coupled to the controlled device. When it is desired to move the controlled device from a stationary state, hydraulic pressure is applied between the piston and cylinder. As the piston is coupled to the stationary controlled device only the cylinder will be able to move, moving the control unit in a first direction which will gradually allow power to move the controlled device. The piston is so coupled to the controlled device that its movement will be in a second direction opposite to said first direction. This will provide a gradual acceleration to the controlled device and the load avoiding any shocks to the system. When it is desired to stop the movement of the controlled device, and the load attached thereto, the fluid to the hydraulic link is cut off. This will hydraulically lock the piston and cylinder so they will no longer be able to move relative to each other. The controlled device will continue moving in the second direction and move the locked piston and cylinder with it. The cylinder will then move the proportional control unit towards its off position by moving it in the second direction slowly reducing the power to the controlled device and thus slowly decelerating the controlled device and the load. A gradual acceleration is likewise obtained when it is desired to move the controlled device from a stopped position.

Other objects and features of the invention will be apparent from the following specification and drawings in which:

FIG. 1 is a block diagram of the present invention; and

FIG. 2 is an illustration of an embodiment of the present invention particularly adapted for use in a helicopter.

FIG. 1 EMBODIMENT

Referring now to the drawings, and more particularly to FIG. 1, a valve 11 is seen connected to a source of pressure by line 13 and to a reservoir by line 12. Valve 11 is connected to ports 18 and 19 on the opposite sides of cylinder 17 by conduits 14 and 15, respectively. The valve 11 has three positions. In position I, schematically shown by lines 11a and 11b, conduits 12 and 13 are connected to conduits 14 and 15, respectively, while in position II, schematically shown by lines 11c and 11d, conduits 12 and 13 are connected to conduits 15 and 14, respectively. In position III, schematically shown by lines 11e and 11f, conduits 14 and 15 are isolated from each other and from conduits 12 and 13. A piston 20 is inside cylinder 17 and has a rod 20f projecting from the left side of the cylinder. A plurality of O-rings 17b or other conventional means are on the circumference of cylinder 17 and allow the cylinder to move relative to a fixed datum 16 and relative to piston 20 housed therein. Proportional control device 23 which controls power to controlled device 25 is mechanically coupled to cylinder 17 by linkage 22, the linkage allowing proportional control device 23 to move a specified distance for a given movement of cylinder 17. Proportional control device 23 could be any of the conventional proportional control devices which can modulate a supply of power 23a. Examples of this might be a servo-valve in a hydraulic system, a rheostat in an electrical control system, etc. If proportional control device 23 is a servo-valve controlled device 25 would be a hydraulic motor while if proportional control device 23 were a rheostat, controlled device 25 would be an electrical motor. For purposes of illustration it is assumed that controlled device 25 has a linear output moving a load in a horizontal direction by being coupled to the load. Obviously, the load could be connected to controlled device 25 so as to move in a non-horizontal direction. Controlled device 25 is also coupled to piston rod 20f by coupling 26 to allow piston rod 20f and hence piston 20 to move a specified distance for a given amount of movement of controlled device 25. If controlled device 25 moves rapidly and/or in a non-horizontal path appropriate linkage may be needed to couple controlled device 25 to piston rod 20f so as to move the piston rod gradually in a horizontal direction for a given movement of controlled device 25.

OPERATION OF FIG. 1 EMBODIMENT

When it is desired to move controlled device 25, and its load, from a stationary condition, directional-valve 11 will be moved to connect either of conduits 14 and 15 to pressure and the other conduit to reservoir depending on which direction it is desired to move controlled device 25. For purposes of illustration let us assume that directional-valve 11 is moved so that line 14 is pressurized by line 13 and line 15 communicated to reservoir by line 12. With line 14 pressurized, power fluid will be directed to chamber 17d of cylinder 17. Piston 20 will not be able to move as it is coupled to controlled device 25 which is now stationary. Since piston 20 and cylinder 17 can move relative to each other and since piston 20 cannot move because of its being rigidly secured to controlled device 25, cylinder 17 will move to the left relative to datum 16 moving proportional control device 23 via coupling 22 to the left. As proportional control device 23 is moved to the left it will gradually increase the power from source 23a to controlled device 25 which will gradually accelerate to the right along with the load without a sudden jerk and/or jolt which would occur if the power to controlled device 25 were fully applied thereto. This is because proportional control device 23 is arranged so that when it moves to the left the supply of power from source 23a is directed to controlled device 25 to move controlled device 25 to the right and vice versa. The power will increase in this manner until full power is applied to controlled device 25 moving it and the load at their full speed. It should be noted that once full power is being directed to controlled device 25 by proportional control device 23 further movement of the proportional control device to the left by continued movement of the cylinder to the left will not change the amount of power applied to the controlled device. As controlled device 25 is moved to the right, it will push piston rod 20f and piston 20 to the right due to coupling 26. If it is desired to stop movement of the load, directional-valve 11 is moved from the position where it is connecting conduit 14 to pressure and line 15 to reservoir to a neutral position, which is schematically shown in FIG. 1, wherein both conduits 14 and 15 are blocked from communicating with themselves or with either of line 12 or 13. This will isolate lines 14 and 15 and lock the fluid in cylinder chambers 17c and 17d. Thus, it will now not be possible for piston 20 and cylinder 17 to move relative to each other and with piston 20 moving to the right as controlled device 25 moves to the right cylinder 17 will also move to the right. This will move proportional control device 23 to the right which will slowly cut off power from source 23a to controlled device 25 bringing controlled device 25 and the load to a gradual halt. Thus, it can be readily seen that the present system will provide a gradual acceleration and deceleration for the load moved by controlled device 25.

The structure of the present invention also allows controlled device 25 and hence the load to move through a predetermined amount of travel, which can be determined by selecting the cylinder volume, and then be brought to a gradual stop. All that is necessary is to maintain pressure to either line 14 or 15 by appropriately positioning servo-valve 11. Thus, if servo-valve 11 were moved so that conduit 14 were continually pressurized cylinder 17 would move to the left and piston 20 would move to the right as controlled device 25 moves to the right. Eventually the volume of cylinder chamber 17c would reach zero and piston 20 would abut the right side of cylinder 17 moving the cylinder to the right as the piston moved to the right. Proportional control device 23 will simultaneously move to the right slowly reducing to zero the amount of power from source 23a to controlled device 25 and thus gradually bringing to a stop the movement of controlled device 25 and the load. Thus it can be seen that if the servo-valve is maintained in a position to pressurize either line 14 or 15 this will result in controlled device 25 undergoing a specific amount of travel and then coming to a gradual stop. If it were desired to change the amount of travel that controlled device 25 and the load undergoes when servo-valve 11 is maintained in a position to continually pressurize either line 14 or 15 all that would be necessary would be to appropriately change the volume of cylinder 17. Parallel analysis will show a similar result if controlled device 25 and the load are moving to the left. From the foregoing discussion it is apparent that piston 20 and cylinder 17 hydraulically link the controlling device and the controlled device so that the latter will never undergo rapid changes in its rate of movement.

FIG. 2 EMBODIMENT

In FIG. 2 an embodiment of the invention is shown that has utility in hydraulic control systems and is specifically adapted for use in helicopters. Elements found in FIG. 2 identical to those disclosed in FIG. 1 will have the same last two digits as those of FIG. 1 only prefaced by the number two. Referring now to FIG. 2, a pair of solenoids A and B control the position of valve spools A' and B', the latter connected to a source of pressure and a reservoir, respectively, and also connected to opposite sides of piston 220 by conduits 214 and 215, respectively. Solenoids A and B are arranged as is conventional in parallel, so that if one solenoid moves one spool to connect one of the conduits leading to one side of the piston to pressure the other solenoid will simultaneously move the other spool to connect the other conduit leading to the other side of the piston to the reservoir and vice versa. A conventional valve C is connected to a mechanical override lever (not shown) as is known in the art. Piston 220 is contained in a cylinder 217 which has ports 218 and 219 which connect lines 214 and 215 to opposite sides of piston 220, respectively. A plurality of O-rings 217b surround the circumference of cylinder 217 and insure that cylinder 217 can move relative to piston 22 and housing 216 which it is within. The right side of cylinder 217 has an internally threaded section 217e through which piston rod 220f projects a short distance. An externally threaded fastener 227 is threaded to section 217e and held adjacent section 217e by a lock nut 260 and has a hollow center portion which encloses the right end of piston rod 220f. Attached to and movable with fastener 227 is a proportional control servo-valve D including a spool 223 which is encased in a housing 224. Housing 224 can be integral with housing 216, as shown, or separate therefrom. Proportional control servo-valve spool 223 has lands 223a and 223b separated by a post 223c. Port 224d in housing 224 is communicated to a source of pressure making chamber 223k as pressure chamber and ports 224h and 224i are communicated with each other by channel 224g which leads to a low pressure reservoir. Ports 224f and 224e communicate with lines 231 and 230 which lead to a rotary hydraulic motor 232. Servo-valve D is a proportional control device since the valve can modulate the amount of pressure to either of lines 230 and 231 by being slightly moved in a horizontal direction. Rotary motor 232 is a conventional rotary motor having an output shaft 232a which is connected to a worm gear 235. A worm wheel 236a is suitably journalled by bearings 237 in a housing 238 and meshes with a screw threaded shaft 236. The left side of cylinder 217 is internally threaded and mates with an externally threaded plug 256. Piston rod 220f slideably extends through plug 256 to be coupled to shaft 236. When the embodiment shown in FIG. 2 is used in a helicopter, rotary motor 232 will rotate the helicopter pod and be mounted on the stubby helicopter wing. Similarly, when the embodiment of FIG. 2 is used to rotate a helicopter pod the volume of cylinder 217 will be chosen so that hydraulic motor 232 will stop its rotation and the rotation of the helicopter pod before the pod rotates a sufficient distance to hit its stop.

OPERATION OF FIG. 2 EMBODIMENT

The operation of the embodiment of FIG. 2 is identical to the operation of the embodiment of FIG. 1. That is to say with rotary motor 232 stationary the operator, the pilot in the case of a helicopter, will operate solenoids A and B so the respective valve spools A' and B' will direct pressure to either of lines 214 or 215 and vent the line not pressurized. For purposes of illustration let us assume that line 214 is pressurized and line 215 is vented. With line 214 pressurized fluid will enter chamber 217d and try to increase the volume thereof. Piston 220 will not be able to move as it is connected to stationary shaft 236 by rod 220f. However, cylinder 217 will be able to move to the left since its motion is in no way constrained. Movement of cylinder 217 to the left will gradually, via fastener 227, move proportional servo control valve spool 223 to the left. This will slowly move land 223a to the left allowing port 224f to slowly come into communication with pressure chamber 223k allowing line 231 to be gradually pressurized until full pressure is applied to line 231. When valve spool 223 is slowly moved to the left, as previously described, land 223b will move slowly to the left gradually communicating port 224e with the reservoir and thus communicating line 230 with a low pressure source. With line 231 pressurized and line 230 communicated to reservoir, rotary motor 232 will rotate with shaft 232a rotating worm gear 235 and a helicopter pod when the system is used in a helicopter. The worm and worm gear threading are arranged so that if line 231 is pressurized with shaft 233a rotating in a counterclockwise direction shaft 236 will move in a rightwards direction. The movement of piston 220, and rod 220f in a rightwards direction will not affect the movement of valve 223 since fastener 227 allows relative motion between the rod and itself. This set of porting conditions will continue until either the solenoids are de-energized or the piston hits either of stops 240a or 240b in its path of travel. It is important to note that the distance cylinder 217 can travel in a horizontal direction is less than the distance piston 220 can move in a horizontal direction to change a once established porting condition in the valve. This insures that as the cylinder moves and establishes porting conditions for valve spool 223 the porting conditions in the valve will not be changed by continued movement of the piston in the same direction. It is believed that it is apparent from the foregoing discussion, especially in connection with FIG. 1, that the rotary motor and the load it moves, which in a helicopter will be the pod, will come to a gradual stop if the solenoids are de-energized to stop pressure from being applied to either side of piston 220 or if the piston hits a cylinder stop. Parallel analysis will show that the rotary motor will undergo a gradual acceleration and deceleration when the rotary motor is rotated in an opposite direction.

When the system is used in a helicopter the volume of cylinder 217 can be appropriately selected so piston 220 will hit a cylinder stop halting movement of the pod before the pod hits one of its own stops. The direction of rotation of rotary motor 232 and the mating of the worm gear and worm wheel can be changed as long as piston rod 220f will always be moving in the opposite direction as cylinder 217 when the piston and cylinder are both moving relative to a fixed datum.

It is thus apparent that the control system of the present invention and the hydraulic link provided by the piston and cylinder insures for a gradual acceleration and deceleration of the hydraulic motor and the load it moves, which will be in the case of a helicopter the pod, without having to provide means to isolate shock in the system.

The reason that there is no need to isolate shock in the present invention is that the system provides that power is gradually applied and dissipated to the motor insuring that the load moved by the motor will not undergo rapid accelerations or decelerations. Without having to provide means to cushion shock the system can be compact and light in weight making it very desirable in helicopters. If it is desired to change the amount of travel the motor and the load it moves undergoes before coming to a stop all that is necessary is to change the size of the cylinder. While the system has specific utility in a helicopter it is apparent that it can be used in any control system.

What is claimed is:

1. A control system comprising:
a movable proportional control device,
a movable controlled device, said controlled device's movement controlled by said proportional control device,
two hydraulic power elements having a first state where they are capable of moving relative to each other and a second state where said power elements are locked for movement in unison with each other,
one of said hydraulic power elements positively coupled to said proportional control device to be positively movable therewith,
the other of said hydraulic power elements coupled to be movable with said controlled device, and
valve means coupled to said hydraulic power elements for selectively placing said power elements in the first or second state.

2. A control system in accordance with claim 1 wherein said hydraulic power elements comprise: a cylinder, a piston housed in said cylinder and having a piston rod extending externally of said cylinder and means for allowing said cylinder and said piston to move relative to each other and relative to a fixed datum.

3. A control system in accordance with claim 2 wherein said piston rod is coupled to said controlled device and said cylinder is coupled to sid proportional control device.

4. A control system in accordance with claim 3 wherein said proportional control device is a proportional servo-valve and said controlled device is a hydraulic motor.

5. A control system in accordance with claim 1 wherein said proportional control device is a proportional servo-valve and said controlled device is a hydraulic motor.

6. A control system in accordance with claim 5 wherein said hydraulic power elements comprise: a cylinder, a piston housed in said cylinder and having a piston rod extending externally of said cylinder and means for allowing said cylinder and said piston to move relative to each other and to a fixed datum.

7. A control system in accordance with claim 6 wherein said piston rod is coupled to said hydraulic motor and said cylinder is coupled to said proportional servo-valve.

8. A control system in accordance with claim 7 wherein said hydraulic motor comprises: a rotary motor having an output shaft, a worm gear connected to said output shaft, a worm wheel in meshing relation with said worm wheel, a screwed shaft movable by said worm wheel and said piston rod coupled to said screwed shaft.

9. A control system comprising:
a movable proportional control device,
a movable controlled device, said movable controlled device's movement controlled by said proportional control device,
power transmission means having a first state coupling said controlled device and said proportional control device with each other so as to allow relative movement between said devices and a second state wherein said proportional control device and said controlled device are locked for movement in unison with each other, and
valve means coupled to said power transmission means for selectively placing said power transmission means in the first or second state.

References Cited

UNITED STATES PATENTS

| | | | |
|---|---|---|---|
| 1,109,022 | 9/1914 | Spicer | 91—388 |
| 3,283,669 | 11/1966 | Lissau | 91—388 |

PAUL E. MASLOUSKY, Primary Examiner

U.S. Cl. X.R.

91—217, 388